United States Patent
Chen et al.

(10) Patent No.: US 10,165,441 B2
(45) Date of Patent: *Dec. 25, 2018

(54) SIMPLE PROTOCOL FOR TANGIBLE SECURITY

(71) Applicant: Microsoft Technology Licensing, LLC, Redmond, WA (US)

(72) Inventors: YuQun Chen, Seattle, WA (US); Michael J. Sinclair, Kirkland, WA (US); Josh D. Benaloh, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/273,166

(22) Filed: Sep. 22, 2016

(65) Prior Publication Data
US 2017/0013459 A1    Jan. 12, 2017

Related U.S. Application Data

(63) Continuation of application No. 14/936,351, filed on Nov. 9, 2015, now Pat. No. 9,503,431, which is a
(Continued)

(51) Int. Cl.
*G06F 21/00* (2013.01)
*H04L 29/06* (2006.01)
(Continued)

(52) U.S. Cl.
CPC ........... *H04W 12/06* (2013.01); *H04L 9/0863* (2013.01); *H04L 9/0869* (2013.01); *H04L 9/14* (2013.01);
(Continued)

(58) Field of Classification Search
CPC .... H04W 12/06; H04W 88/02; H04L 63/083; H04L 9/0863; H04L 9/14; H04L 63/06;
(Continued)

(56) References Cited

U.S. PATENT DOCUMENTS 6,396,916 B2 * 5/2002 Jordan .................. H04M 3/382
  379/189
6,839,692 B2   1/2005 Carrott et al.
(Continued)

OTHER PUBLICATIONS

"Announcing the Advanced Encryption Standard (AES)". Nov. 26, 2001. Federal Information Processing Standards Publication 197. «http://csrc.nist.gov/publications/fips/fips197/fips-195.pdf» Last accessed Jul. 21, 2008, 21 pages.
(Continued)

*Primary Examiner* — Lisa C Lewis
(74) *Attorney, Agent, or Firm* — Schwegman Lundberg & Woessner, P.A.

(57) ABSTRACT

The claimed subject matter provides systems and/or methods that effectuate a simple protocol for tangible security on mobile devices. The system can include devices that generate sets of keys and associated secret identifiers, employs the one or more keys to encrypt a secret and utilizes the identifiers and encryptions of the secret to populate a table associated with a security token device that is used in conjunction with a mobile device to release sensitive information persisted on the mobile device for user selected purposes.

20 Claims, 10 Drawing Sheets

Related U.S. Application Data continuation of application No. 12/250,308, filed on Oct. 13, 2008, now Pat. No. 9,185,109.

(51) Int. Cl.
　　*H04W 12/06*　　(2009.01)
　　*H04L 9/08*　　(2006.01)
　　*H04L 9/14*　　(2006.01)
　　*H04W 88/02*　　(2009.01)

(52) U.S. Cl.
　　CPC ...... *H04L 63/0428* (2013.01); *H04L 63/0492* (2013.01); *H04L 63/06* (2013.01); *H04L 63/083* (2013.01); *H04L 63/0853* (2013.01); *H04L 2209/24* (2013.01); *H04W 88/02* (2013.01)

(58) Field of Classification Search
　　CPC ............... H04L 9/0869; H04L 63/0428; H04L 63/0492; H04L 63/0853; H04L 2209/24
　　See application file for complete search history.

(56) References Cited

U.S. PATENT DOCUMENTS

| | | | |
|---|---|---|---|
| 6,905,072 B2* | 6/2005 | Ramachandran | .... G06K 7/0004 235/462.45 |
| 7,269,732 B2 | 9/2007 | Kilian-Kehr | |
| 7,299,364 B2* | 11/2007 | Noble | ...................... G06F 21/35 340/5.6 |
| 7,437,554 B1 | 10/2008 | Arnold et al. | |
| 7,587,051 B2* | 9/2009 | Bisson | .................. H04L 9/0825 380/281 |
| 8,112,787 B2* | 2/2012 | Buer | ...................... H04L 9/3271 713/168 |
| 9,185,109 B2 | 11/2015 | Chen et al. | |
| 2002/0069177 A1 | 6/2002 | Carrott et al. | |
| 2003/0005300 A1 | 1/2003 | Noble et al. | |
| 2003/0070101 A1* | 4/2003 | Buscemi | ................. H04L 63/08 726/8 |
| 2003/0204732 A1 | 10/2003 | Audebert et al. | |
| 2003/0224754 A1* | 12/2003 | Herzog | ................... G06Q 20/04 455/406 |
| 2004/0101141 A1* | 5/2004 | Alve | ...................... G06F 21/602 380/278 |
| 2005/0105734 A1 | 5/2005 | Buer et al. | |
| 2005/0287985 A1 | 12/2005 | Balfanz et al. | |
| 2008/0098134 A1* | 4/2008 | Van Acht | ................. G06F 21/35 710/33 |
| 2008/0276098 A1* | 11/2008 | Florencio | ................. G06F 21/46 713/183 |
| 2008/0304663 A1* | 12/2008 | Canard | ............... G06F 21/6254 380/45 |
| 2010/0031349 A1* | 2/2010 | Bingham | ................. G06F 21/31 726/20 |
| 2010/0052858 A1* | 3/2010 | Canora | ............... G07C 9/00111 340/10.1 |
| 2010/0186076 A1* | 7/2010 | Ali | ......................... G06F 21/34 726/9 |
| 2010/0313275 A1* | 12/2010 | Ibrahim | .................. G06F 21/88 726/26 |
| 2016/0065544 A1 | 3/2016 | Chen et al. | |

OTHER PUBLICATIONS

BBC News | Asia-Pacific | Malaysia car thieves steal finger, Mar. 31, 2005. «http://news.bbc.co.uk/2/hii/asia-pacific/4396831.stm» Last accessed Jul. 21, 2008, 1 page.

Biometrics: Who's Watching Yo? Electronic Frontier Foundation Whitepapers. «http://www.eff.org/wp/biometrics-whos-watching-you» Last accessed Jul. 21, 2008, 6 pages.

Corner, et al., "Zero-Interaction Authentication". MOBICOM'02, Sep. 23-28, 2002, Atlanta, Georgia, USA. ACM 1-58113-486-X/02/0009. «http://delivery.acm.org/10.1145/280000/570647/p1-corner.pdf?key1=570647&key2=4682276121&coll=GUIDE&dl=ACM&CFID=37546586&CFTOKEN=95898940» Last accessed Jul. 22, 2008, 11 pages.

Haselsteiner, et al., "Security in Near Field Communication (NFC)" Strengths and Weaknesses. «http://events.iaik.turgraz.at/RFIDSec06/Program/papers/002%20-%20Security%20NFC.pdf» Last accessed Jul. 21, 2008, 11 pages.

Jansen, et al., "Proximity Beacons and Mobile Device Authentication: An Overview and Implementation". NISTIR 7200, Jun. 2005. «http://csrc.nist.gov/publications/nistir/NIST-IR-7200.pdf» Last accessed Jul. 21, 2008, 36 pages.

Karygiannis, et al., "Guidelines for Securing Radio Frequency Identification (RFID) Systems", Special Publication 800-98. Apr. 2007. «http://csrc.nist/gov/publications/nistpubs/800-98/SP800-98_RFID-2007.pdf» Last accessed Jul. 21, 2008, 154 pages.

iButton Overview «http://www.maxim-ic.com/projects/ibutton/ibuttons/» Last accessed Jul. 21, 2008, 3 pages.

Office Action for U.S. Appl. No. 12/250,308, dated Dec. 16, 2011, YuQun Chen, "Simple protocol for tangible security", 9 pgs.

Office action for U.S. Appl. No. 12/250,308, dated Feb. 23, 2015, Chen et al, "Simple protocol for tangible security", 7 pages.

Office action for U.S. Appl. No. 14/936,351, dated Mar. 31, 2016, Chen et al., "Simple protocol for tangible security", 13 pages.

Final Office Action for U.S. Appl. No. 14/936,351, dated May 19, 2016, YuQun Chen, "Simple protocol for tangible security", 7 pages.

Office action for U.S. Appl. No. 12/250,308, dated May 23, 2012, Chen et al., "Simple protocol for tangible security", 10 pages.

Office action for U.S. Appl. No. 12/250,308, dated Jul. 21, 2014 Chen et al., "Simple protocol for tangible security", 14 pages.

Security token. «http://en.wikipedia.org/wiki/Security_token» Last accessed Jul. 22, 2008, 6 pages.

Seo, et al., "A Lightweight Protocol Enabling Ownership Transfer and Granular Data Access of RFID Tags". In The 2007 Symposium on Cryptography and Information Security, Sasebo, Japan, Jan. 23-26, 2007. «http://caislab.icu.ac.kr/Paper/paper_files/2007/SCIS2007_Youngjoon.pdf» Last accessed Jul. 22, 2008, 6 pages.

Smart, et al., A Wearable public key infrastructure (WPKI). 0-7695-0795-6/00 IEEE. «http://ieeexplore.ieee.org/iel5/7125/19202/00888474.pdf?tp=&amumber=888474&isnumber=19202» Last accessed Jul. 22, 2008, 7 pages.

Stadlober, "An Evaluation of Security Threats and Countermeasures in Distributed RFID Infrastructures", Jul. 2005. «http://www.iicm.tu-gaz.ac.at/thesis/sstadlober.pdf» Last accessed Jul. 21, 2008, 113 pages.

Strong Authentication: "Security Identities and Enabling Business". Technology White Paper. «http//viewer.bitpipe.com/viewer/viewDocument.do?accessid=7870078» Last accessed Jul. 22, 2008, 18 pages.

Strong Authentication: An Essential Component of Identity and Access Management. White Paper. «http://rsa-email.rsa.com/servlet/campaignrespondent» Last accessed Jul. 21, 2008, 12 pages.

Zimmerman, "Personal Area Networks: Near-field intrabody communication". In IBM Systems Journal, vol. 35, Nos. 3 & 4, 1996. «http://www.research.ibm.com/journal/sj/353/sectione/zimmerman.html» Last accessed Jul. 21, 2008, 6 pages.

* cited by examiner

SIMPLE PROTOCOL FOR TANGIBLE SECURITY

RELATED APPLICATIONS

This application claims priority to and is a continuation of U.S. patent application Ser. No. 14/936,351 filed on Nov. 9, 2015 which is a continuation of U.S. patent application Ser. No. 12/250,308, filed on Oct. 13, 2008 now U.S. Pat. No. 9,185,109, the entire contents of both are incorporated herein by reference.

BACKGROUND

The mobile phone is fast becoming an all-encompassing, personal accessory for communication, entertainment, and personal finance. As the mobile phone becomes the ultimate wallet, as well as the keeper of sensitive personal information, securing it against theft and hacking will eventually become of paramount importance. To date, the primary concern for most users has been prevention of theft; mobile phones generally are easier to lose than wallets, because the mobile phone typically is utilized much more frequently. In recognition of this fact, many software and hardware mechanisms have been proposed or implemented to make it difficult for hackers to obtain sensitive information from stolen phones. Nevertheless, few, if any, of these schemes have been promising against hardcore hackers.

In addition, the main drawback of existing protection schemes is the requirement that users authenticate themselves to their mobile device, for example, by typing a password or personal identification number (PIN) code. This inconvenience causes many users to disable these security measures completely. Nonetheless, there currently are proposals to use biometrics, such as, fingerprints to replace passwords. These methods, however, have yet to prove themselves useful to typical users. Furthermore, there are several problems with biometrics. Firstly, since fingerprints are fairly easy to capture and forge, biometric readers can be deceived. Secondly, unlike passwords, existing biometrics generally rely on static and permanent data about a person, e.g., fingerprints and iris patterns; thus they can neither be renewed, nor replaced. Moreover, there is a growing concern that once a person's biometrics data has been misappropriated, the game is effectively over with regard to re-utilization of such stolen information.

The subject matter as claimed is directed toward resolving or at the very least mitigating, one or all the problems elucidated above.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

Existing security measures for mobile devices typically fall into two categories: passwords and biometrics. For different reasons it has been found that neither has been satisfactory to truly protect sensitive data persisted or associated with mobile devices from unauthorized access. Accordingly, the disclosed and claimed subject matter utilizes a new scheme to protect such sensitive data, analogous to using physical keys to unlock doors. Under this conception, a user wears or is closely associated with one or more security tokens of which presence in close proximity to the user's mobile device allows secrets ensconced, concealed, or secreted on the mobile device to be locked and/or unlocked. As long as the miscreant or malefactor is unable to obtain the security token or the mobile device, security is generally guaranteed. This approach can be referred to as tangible security.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
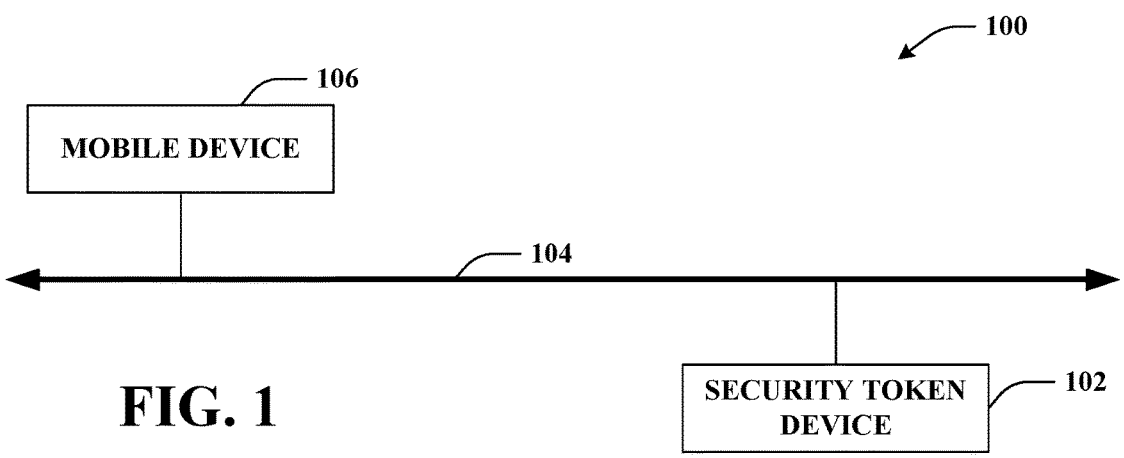
FIG. 1 illustrates a machine-implemented system that effectuates and/or facilitates a simple protocol for tangible security on mobile devices.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Mimicking real-world locks and keys, the claimed subject matter provides a new approach to mobile device security. The central idea is to separate security management from the mobile device itself: Under such a conception, the user wears a device, such as a security token, which contains the cryptographic key(s) for unlocking sensitive data on the mobile device. An example of such a wearable token could be finger ring. When unlocking a critical functionality on the mobile device, for instance, a payment module, the user need simply tap the mobile device with the wearable token. It should be noted without limitation or loss of generality that in the case of the wearable ring token, holding the phone in the hand may be sufficient for these purposes. Other suitable devices include a watch or watchband, bracelet, necklace, cufflinks, and tie clip. The security token could also be contained in a key fob or card that can be kept in a wallet or purse.

When the phone and the security token are in contact or in close proximity with one another, interchange can take place in order for the mobile device to obtain the necessary rights (e.g., from the token) to access protected functionalities/data persisted and/or associated with the mobile device. Accordingly, in order to facilitate and/or actuate access to such functionalities/data, the claimed matter without limitation or loss of generality can employ security protocols such that an unauthorized interloper (e.g., a thief, hacker, and the like) would need to gain access to both the mobile device and as well as the security token; a much more difficult task to accomplish. Likewise, a user would need to lose both the mobile device as well as the security token before he/she would need to worry about secure functionalities and/or data (e.g., money) being surreptitiously accessed or stolen from his/her mobile device.

Without limitation or loss of generality, the claimed and described subject matter utilizes two main entities: a mobile device and a security token. The security token can be analogized as a key and the mobile device as a car that the key is capable of locking/unlocking. While the description focuses on the simplest case wherein a user carries only one security token the claimed matter is not necessarily so limited as the simple solution presented herein can be generalized and scaled to a multiple token configuration wherein a subset of the these multiple security tokens can be employed to activate/deactivate the mobile device.

In the simplest case, the security token contains just the root key from which all other keys (e.g., subkeys) utilized by the mobile device can be derived. The more advanced aspects of the claimed subject matter can have multiple keys and secrets stored or associated with the security token. The problem of maintaining security in such a multi key system remains the same, regardless of the number of secrets or keys stored or associated with the security token. Thus, solely for purposes of clarity of description the claimed matter is elucidated in terms of the single-key case and further it is assumed that the root key is the encryption key for all secrets on the mobile device and that this secret can be denoted by S.

FIG. 1 depicts a machine implemented system 100 that effectuates and/or facilitates a simple protocol for tangible security on mobile devices. System 100 can include security token device 102 that can contain one or more cryptographic keys for unlocking or locking sensitive data on mobile device 106, the one or more cryptographic keys typically being distributed from security token device 102 to mobile device 106 and/or disseminated from mobile device 106 to security token device 102 via communication or network topology 104. Security token device 102 can be included with, or incorporated in, textiles, fabrics, clothing, jewelry, or any item that can be worn, and typically is a tangible object. Additionally, security token device 102 can be a Radio Frequency Identification (RFID) device, or can incorporate or subsume a Radio Frequency Identification (RFID) device. For instance, security token device 102 can be a wristband or finger ring that has embedded therein a Radio Frequency Identification (RFID) tag or chip. Additionally, security token device 102 can have mechanical, acoustical, or optical communication means. All of these means—direct electrical contact, RFID, NFC, acoustical and optical—can also supply a source of harvestable energy for electrically powering security token device 102. Security token device 102 exhibiting direct contact for communication has the least chance of being compromised by an interloper during mobile device 106 and security token device 102 communication. Also, direct electrical contact generally does not require an antenna or other collecting device other than electrical contact and hence, can be made smaller and at lower cost. Metal jewelry, for example, can benefit from this mode of communication without having to expose a detector or antenna. Security token device 102 can typically have persisted thereon at least a root key associated with the mobile device 106 from which all other keys utilized by mobile device 106 can be derived. In some aspects of the claimed subject matter multiple root keys and/or more secrets affiliated with mobile device 106 can be stored in or on security token device 102.

As illustrated security token device 102 can be in continuous and operative, or sporadic and/or intermittent, communication with mobile device 106 via communication or network topology 104. Moreover, security token device 102 can be implemented entirely in hardware and/or a combination of hardware and/or software execution. Further, security token device 102 can be incorporated within and/or associated with other compatible components.

Network topology 104 can include any viable communication and/or broadcast technology, for example, wired and/or wireless modalities and/or technologies can be employed to effectuate the claimed subject matter. Moreover, network topology 104 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distributed, and/or any combination, permutation, and/or aggregation thereof. Additionally, network topology 104 can include or encompass communications or interchange utilizing Near-Field Communications (NFC) and/or communication utilizing electrical conductance through the human skin surface, for example.

Mobile device 106 can be implemented entirely in hardware and/or as a combination of hardware and/or software in execution. Further mobile device 106 can be any type of machine that includes a processor and is capable of effective communication with network topology 104. Illustrative machines that can comprise mobile device 106 can include desktop computers, server class computing devices, cell phones, smart phones, laptop computers, notebook computers, Tablet PCs, consumer and/or industrial devices and/or appliances, hand-held devices, personal digital assistants, multimedia Internet mobile phones, multimedia players, and the like. Moreover, mobile device 106 can be utilized as a repository and/or steward of sensitive personal information (e.g., bank account details, Social Security numbers, credit card numbers, debit card numbers, health information, credit score, personal preferences, etc.), which can in turn be utilized to make payments and to release further and selected information to, for example, health care workers (physicians, and the like), financial institutions, consumer retail and/or wholesale establishments, and the like.

Figure 2:
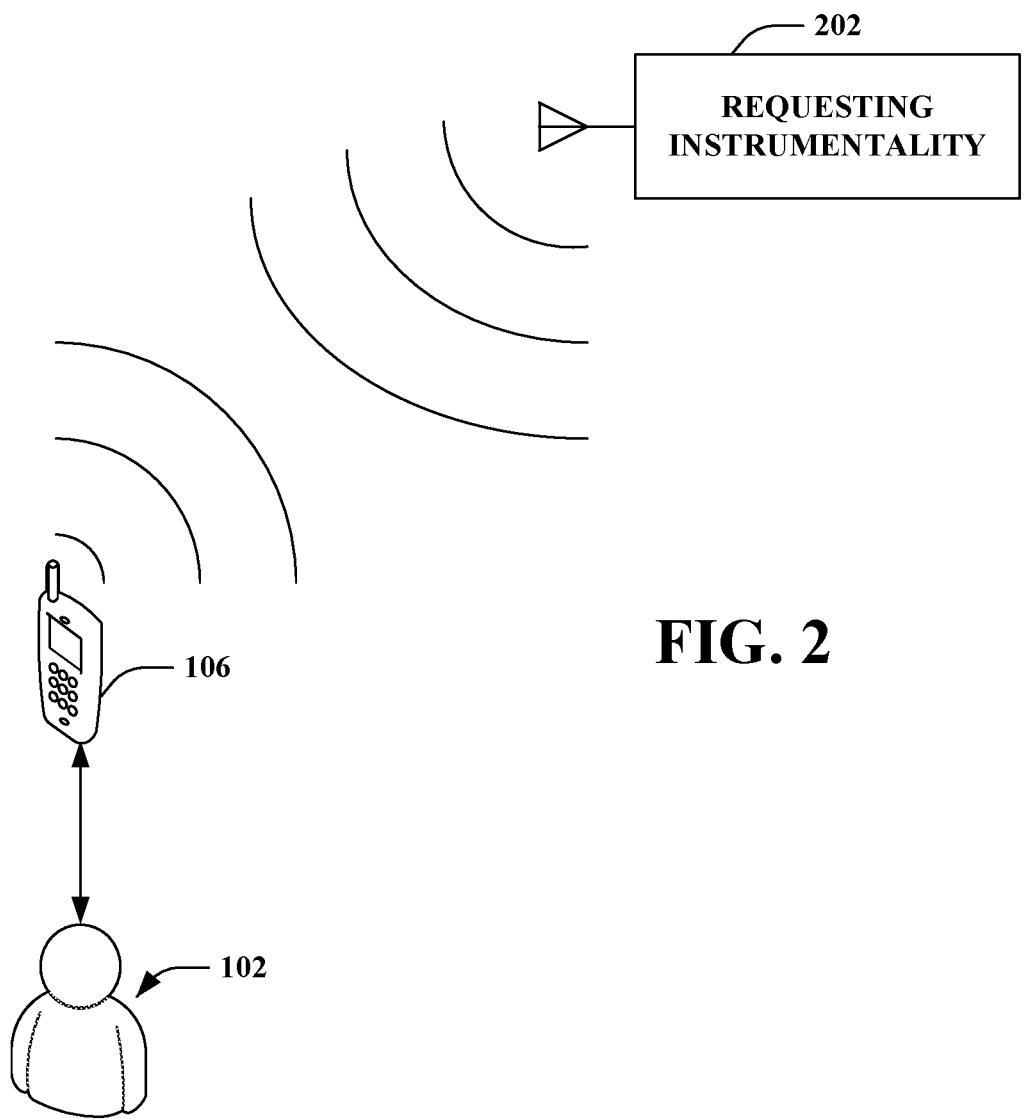
FIG. 2 provides depiction of a machine implemented system that effectuates and/or facilitates a simple protocol for tangible security on mobile devices in accordance with an aspect of the claimed subject matter.

FIG. 2 provides depiction of a machine implemented system 200 that effectuates and/or facilitates a simple protocol for tangible security on mobile devices in accordance with an aspect of the claimed subject matter. System 200 can include security token device 102 and mobile device 106, since the configuration and operation each of which are substantially similar or the same as that described with respect to FIG. 1, the detailed description of such features has been omitted for the sake of brevity and clarity of exposition. Nevertheless, it should be observed that in this depiction security device 102 is being worn or carried (e.g., by way of one or more of a finger ring, necklace, earrings, labret, clothing, fabric, textile, . . . ) by the user or owner of mobile device 106. Separating the security management functionality from mobile device 106 and devising appropriate security protocols that severs or separates the security management functionality from mobile device 106 such that the user carries or wears security token device 102 ensures that a potential thief needs to misappropriate both mobile device 106 as well as security token device 102. Additionally, system 200 can also include requesting instrumentality 202 (e.g., retail or financial institution device such as a point-of-sale (POS) device, Automated Teller Machine (ATM), and the like).

As illustrated mobile device 106 can be in constant, or intermittent but operative, communication with requesting instrumentality 202. Typically, however, mobile device 106 will be in sporadic communication with requesting instrumentality 202, via appropriately positioned antennae, when owner/user of mobile device 106 wishes to obtain funds from his or her financial institution to pay for goods and/or services rendered by retail establishments or service providers, for instance. Generally, interaction between mobile device 106 and requesting instrumentality 202 can take one of two forms, for example. In accordance with one illustrative aspect, the owner/user of mobile device 106 may wish to obtain "electronic" funds from his or her financial institution and persist these "electronic funds" on mobile device 106 for future payment of goods and/or services purchased at a subsequent time. Thus in accordance with this illustrative aspect, system 200 can operate, without limitation or loss of generality, in the following manner. Mobile device 106 can be placed in communication with security token device 102. For instance, mobile device 106 can be brought into close proximity (e.g., within millimeters) of security token device 102. Alternatively and/or additionally, mobile device 106 and security token device 102 can be brought into momentary physical contact with one another (e.g., mobile device 106 and security token device 102 can be "tapped" together).

Regardless of whether mobile device 106 and security token device 102 are brought into contact or in proximity with one another, communication and data interchange between mobile device 106 and security token device 102 can be effectuated between the two devices when mobile device 106 requests a key from security token device 102. The basic concept that underpins that described and claimed subject matter is that multiple one-time keys can be persisted or associated with security device 102. Each one-time key can be associated with a distinct encryption of secret S. Accordingly, every time mobile device 106 wants access to secret S, it can request an encrypted value from security token device 102 and upon receipt and/or utilization of the encrypted value can subsequently discarded.

For the purposes of exposition and not limitation it is assumed herein that secret S is a 128-bit Advanced Encryption Standard (AES) key that can be used to encrypt everything important on mobile device 106. In addition, the Advanced Encryption Standard (AES) can be employed to encrypt/decrypt secret S. Moreover, in this discussion the encryption and decryption functions can be denoted as $E(x, k)$ and $D(x', k)$, respectively, where x is the plaintext, x' the ciphertext, and k represents a symmetric key.

The symmetric keys that are typically used to encrypt secret S can be denoted by $k_1, \ldots, k_N$, where N is a constant selected based at least in part on the memory size of the token. Accordingly, the encrypted value of secret S from key $k_i$ can be denoted as $e_i$ (e.g., $e_i=E(S, k_i)$ and $S=D(e_i, k_i)$). Further, it can be assumed for the purpose of exposition without loss of generality or limitation that a 128-bit pseudo-random number—the validation number $p_i$—is associated with each $(e_i, k_i)$.

Further, on security token device 102 a hash table $T_{token}$ of N entries can be maintained wherein each entry consists of a pair $(p_i, e_i)$ and the index is computed from $p_i$. Similarly, on mobile device 106 a hash table $T_{phone}$ of N entries can be established wherein each entry holds a pair $(p_i, k_i)$. Both hash tables (e.g., $T_{token}$ and $T_{phone}$) can use the same hash function H: $\{0, 1\}^{128} \rightarrow \{1 \ldots N\}$.

Figure 3:
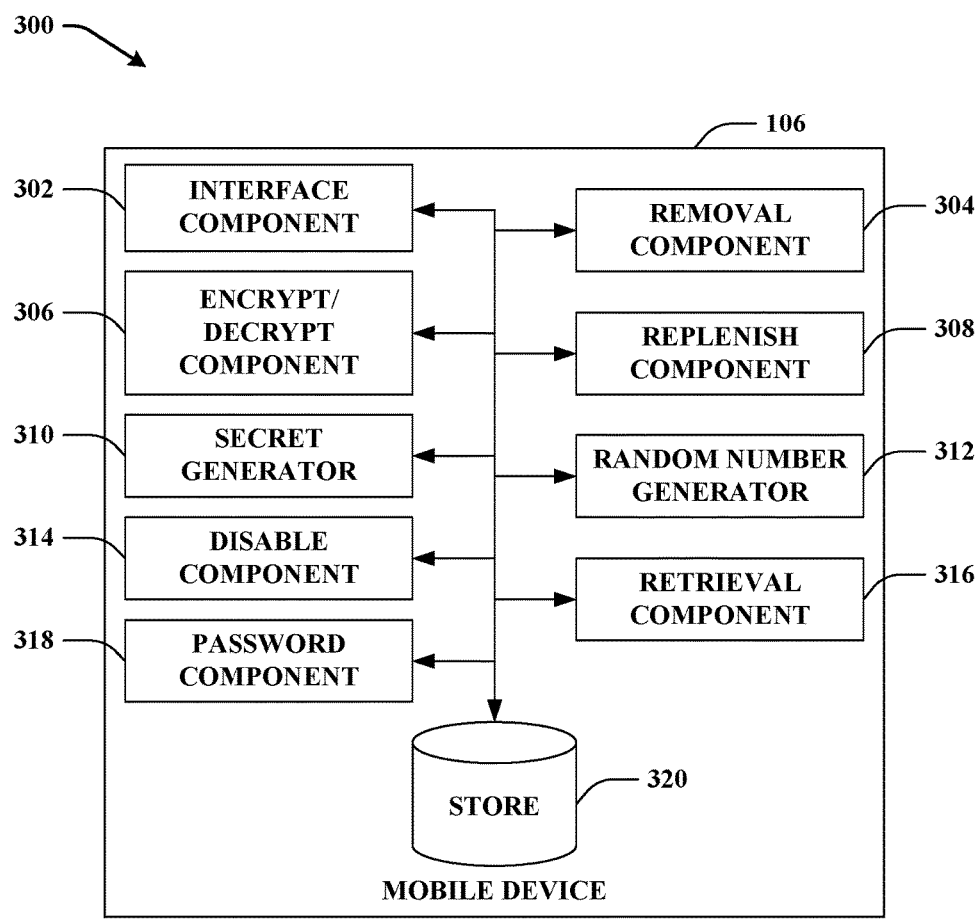
FIG. 3 provides further illustration of mobile device that actuates and/or facilitates a simple protocol for tangible security on mobile devices in accordance with aspects of the claimed and disclosed matter.

FIG. 3 provides further illustration 300 of mobile device 106 that actuates and/or facilitates a simple protocol for tangible security on mobile devices in accordance with aspects of the claimed and disclosed matter. As illustrated mobile device 106 can include interface 302 (hereinafter referred to as "interface 302") that can receive and disseminate, communicate, and partake in data interchange with a plurality of different sources (e.g., security token device 102, communications from cellular-phone, and the like) and in particular can be in continuous and/or intermittent communication with security token device 102 (not shown) via network topology 104.

As stated above, interface 302 can receive and transmit data from, and to, a multitude of sources, such as for example, data associated with user names and passwords, sets of encryption and/or decryption keys, client applications, services, users, clients, devices, and/or entities involved with a particular transaction or portions of transactions. Additionally interface 302 can be utilized as a programming interface in order to disseminate, distribute, or populate security token device 102 with a plurality of generated AES keys (e.g., $k_1, \ldots, k_N$) which can be written or persisted with a hash table (e.g., $T_{token}$) associated with security token device 102. It should be noted that when interface 302 acts as a programming interface in order to disseminate, distribute, or populate the a plurality of generated AES keys to security toke device 102 the two devices (e.g., mobile device 106 and security token device 102) are typically in contact or electrically coupled with one another. Such electrical contact allows mobile device 106 to directly power security token device 102 and to update the security token devices' memory (e.g., non-volatile random access memory (NVRAM)) as well as allowing mobile device 106 to refill security token device's 102 hash table (e.g., $T_{token}$) on demand.

Mobile device 106 can also include removal component 304 that can be used when mobile device 106 is employed to program security device 102 and the initial (plaintext) secret needs to removed from mobile device 106 immediately after mobile device 106 has: randomly generated AES keys $k_1, \ldots, k_N$ such that there are few, if any collisions, among $H(k_1), \ldots, H(k_N)$, computed $e_i=E(S, k_i)$, i=1 . . . N, and persisted each $(p_i, e_i)$ to table $T_{token}$ at entry $H(k_i)$ and similarly stored each $(p_i, k_i)$ to table $T_{phone}$.

Further mobile device 106 can include encrypt/decrypt component 306 that can utilize AES keys to encrypt everything that is important on mobile device 106. Additionally, encrypt/decrypt component 306 can utilize AES to encrypt/decrypt secret S. Nevertheless, as will be recognized by those moderately conversant in this field of endeavor other encryption/decryption schemes and techniques can be utilized to effectuate the claimed matter. For instance, rather than utilizing AES encryption, other alternative symmetric key systems (e.g., block ciphers or stream ciphers) or asymmetric public key systems (PKS) can be utilized with equal effect. Examples of cryptographic asymmetric public key systems that can be employed by the claimed subject matter, and particular encrypt/decrypt component 306, can include techniques such as Diffie-Hellman, Digital Signature Standard (DSS), various elliptic curve modalities, RSA, Cramer-Shoup, Merkle-Hellman "knapsack" algorithms, Paillier cryptosystems, etc. Examples of symmetric key systems that can be employed with equal utility by encrypt/decrypt component 306 can include techniques such as Twofish, Blowfish, Serpent, RC4, Data Encryption Standard (DES), Triple Data Encryption Standard (3DES), International Data Encryption Algorithm (IDEA), and the like. Moreover it should be noted, solely for the purposes of exposition rather than limitation or loss of generality, that the key length that can be utilized for purposes of encryption can be of any desired length.

Moreover mobile device 106 can also include replenish component 308 that can be employed when mobile device 106, or more particularly the hash tables (e.g., $T_{phone}$ and $T_{token}$) associated with mobile device 106 and security token device 102 need to be refilled. The size of the one-time pad $T_{token}$ can be selected or identified so that users only need to reprogram their mobile device 106 and associated security token device 102 combination infrequently. For example, if it is assumed that there is a retrieval rate of 50 times per day, a hash table of 1500 entries requires reprogramming only once a month. It would nevertheless be more convenient and efficacious if mobile device 106, through the aegis of replenish component 308, dynamically and/or automatically updates the hash tables associated with security token device 102 and mobile device 106 (e.g., $T_{token}$) as entries are being consumed and/or when the number of unused entries falls below a specified threshold. Such a facility can be termed an online update (as opposed to offline reprogramming that a user can undertake when initially or subsequently configuring (or reconfiguring) mobile device 106 and its associated security token device 102). The key aspect of a secure online update is that the new entry to be installed and/or associated with security token device 102—the refill—must not be easily deciphered by an eavesdropper. The only time an eavesdropper can obtain the content of the refill is when the entry is being consumed. However, the relatively simple circuitry typically associated with security token device 102, due to its low power constraint, means the refill cannot be sent over the air using strong cryptographic functions. Although one can use pseudo-random numbers to scramble the updates, such a scheme either has limited number of refills per entry or is insecure if unlimited refills (per entry) are allowed. A further complication can arise because the mobile device's 106 radio wave may be insufficient for powering the token to update its memory (e.g., non-volatile random access memory (NVRAM)). Therefore interface 302 (e.g., the programming interface) can be used for table refills. To do this replenish component 308 can simply use the plaintext secret from a successful retrieval to generate more entries and download them to the security token device 102.

Additionally, mobile device 106 can include secret generator 310 which can be utilized when a user of mobile device 106 and its associated security token device 102 is initially programmed or subsequently reprogrammed. Here the user of mobile device 106 and its associated security token device 102 can utilize secret generator 310 to randomly generate N keys $k_1, \ldots, k_N$, such that there are few, if any, collisions among $H(k_1), \ldots, H(k_N)$, compute $e_i=E(S, k_i)$, i=1 . . . N, and persist each $(p_i, e_i)$ to table $T_{token}$ associated with security token device 102 at entry $H(k_i)$ and similarly store each $(p_i, k_i)$ to table $T_{phone}$ associated with mobile device 106. It should be noted that in addition to secret generator 310 being included with mobile device 106, this component can also be included and utilized on a user's home personal computer (e.g., desktop, laptop, notebook computer, etc.). Nevertheless, regardless of whether secret generator 310 is utilized on mobile device 106 and/or the user's home personal computer, secret generator 310 populates entries into the hash tables associated with mobile device 106 and security token device 102.

Furthermore, mobile device 106 can additionally include random number generator 312 that can be employed to generate and associate a 128-bit pseudo-random number, the validation number, $p_i$ with each $(e_i, k_i)$. It should be noted that the claimed matter is not necessarily limited to the use of a 128-bit pseudo-random number as pseudo-random numbers of various and disparate lengths can be utilized as well.

Further as depicted mobile device 106 can include disable component 314 that can be used when secure token device 106 is misplaced or has been stolen. Disable component 314 associated with mobile device 106 can be employed to disable the tangible security features elucidated with regard to the claimed matter in order to resort to the more traditional methods of authentication provided by password component 318 that can provide a strong password facility and/or functionality.

Moreover as illustrated mobile device 106 can also include retrieval component 316 that can be utilized when mobile device 106 needs to retrieve a secret from security token device 102. Retrieval component 316 can operate in the following manner whereby when a retrieval request is necessitated retrieval component 316 can identify and select an unused entry in the hash table associated with mobile device 102 (e.g., $T_{phone}$)—referred to as (p, k). Retrieval component 316 can then send a retrieval command along with validation number p to security token device 102.

Upon receiving validation number p, security token device 102 can check the entry (p', e) at index H(p). If the two validation numbers match, e.g., p'=p, security token device 102 can send back e.

Once retrieval component 316 receives e from security token device 102 it can decrypt e thus rendering the secret S. Once retrieval component 316 has obtained e it can use removal component 304 to immediately wipe out the entry (p, k). This action ensures that in the event of mobile device 106 being stolen from this point on, it will be unable to recover the secret S using recorded data interchange.

In addition, mobile device 106 can include store 320 that can include any suitable data necessary, such as hash table $T_{phone}$, for mobile device 106 to facilitate and/or actuate it aims. Further, store 320 can also include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate networks, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information obtained from the disparate network, ratings from a website, a credit score, geographical location, a donation to charity, or any other information related to software, applications, web conferencing, and/or any suitable data related to transactions, etc.

It is to be appreciated that store 320 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM), and Rambus® dynamic RAM (RDRAM). Store 320 of the subject systems and methods is intended to comprise, without being limited to, these and any other suitable types of memory. In addition, it is to be appreciated that store 320 can be a server, a database, a hard drive, and the like.

Figure 4:
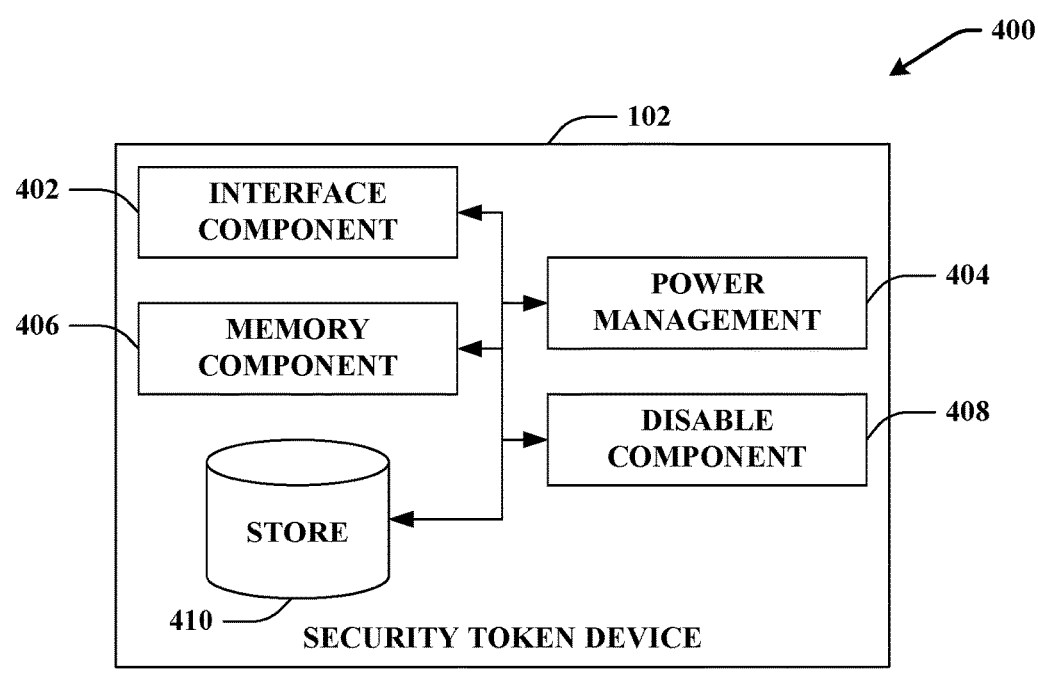
FIG. 4 provides depiction of security token device that facilitates and/or effectuates a simple protocol for tangible security on mobile device in accordance with various aspects of the described and disclosed subject matter.

FIG. 4 provides depiction 400 of security token device 102 that facilitates and/or effectuates a simple protocol for tangible security on mobile device in accordance with various aspects of the described and disclosed subject matter. As illustrated security token device 102 can include interface component 402 (hereinafter referred to as "interface 402") that can operate in a substantially similar manner as that elucidated above in connection with interface 302 associated with mobile device 106. Accordingly, in view of this similarity between interface 302 and interface 402 an extensive description of the capabilities of interface 402 has been omitted for the sake of brevity and to avoid prolixity.

Additionally, security token device 102 can include a power management aspect 404 that can monitor and/or curtail excessive power usage by security token device 102. As will be appreciated by those skilled in this endeavor security token device 102 is typically a batteryless device that generally obtains its power from devices with which it is in communication (e.g., mobile device 106). Thus power management aspect 404 can when necessary direct and/or redirect power to the various aspects of security token device 102 necessary for its continued and viable operation.

Further, security token device 102 can also include memory component 406 the size of which can be utilized in part to determine an appropriate size from the respective hash tables (e.g., $T_{phone}$ and $T_{token}$) persisted on mobile device 106 and security token device 102. Moreover, the size of memory component 406 can also be utilized to determine the minimum number of tables necessary within a particular period of time. Moreover, as has been stated earlier the memory utilized by memory component 406 is typically non-volatile random access memory (NVRAM) but as will be appreciated other types of memory can be utilized with equivalent effect.

Additionally security token device 102 can include disable component 408 that can be utilized if and when the user misplaces mobile device 106 or where mobile device 106 is misappropriated by an unscrupulous interloper. As will be appreciated disable component 408 can be set to off by default which permits access by mobile device 106. In the case of loss of mobile device 106, the user can utilize disable component 408 to ensure that the misplaced or misappropriated mobile device 106 cannot make any meaningful use of security token device 102 by being in close proximity to the user.

Moreover, security token device 102 can include store 410 that that can include any suitable data necessary, such as hash table $T_{token}$, for security token device 102 to facilitate and/or actuate it aims. Since the functionalities and facilities of store 410 can be substantially identical or similar to those outlined in connection with mobile device 106 and store 320 above, a detailed description of such features and functionalities have been omitted for the sake of brevity.

Figure 5:
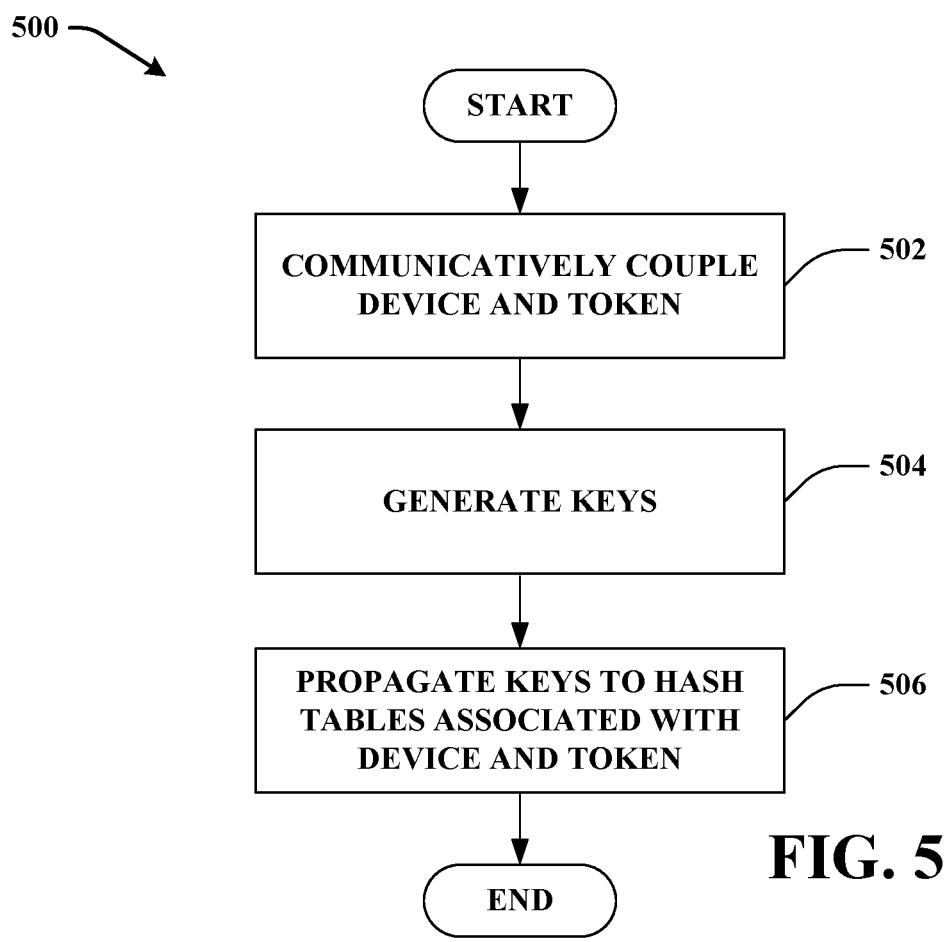
FIG. 5 provides depiction in flow chart form of a machine implemented methodology for effectuating and/or facilitating a simple protocol for tangible security on mobile devices in accordance with an aspect of the claimed subject matter.
Figure 6:
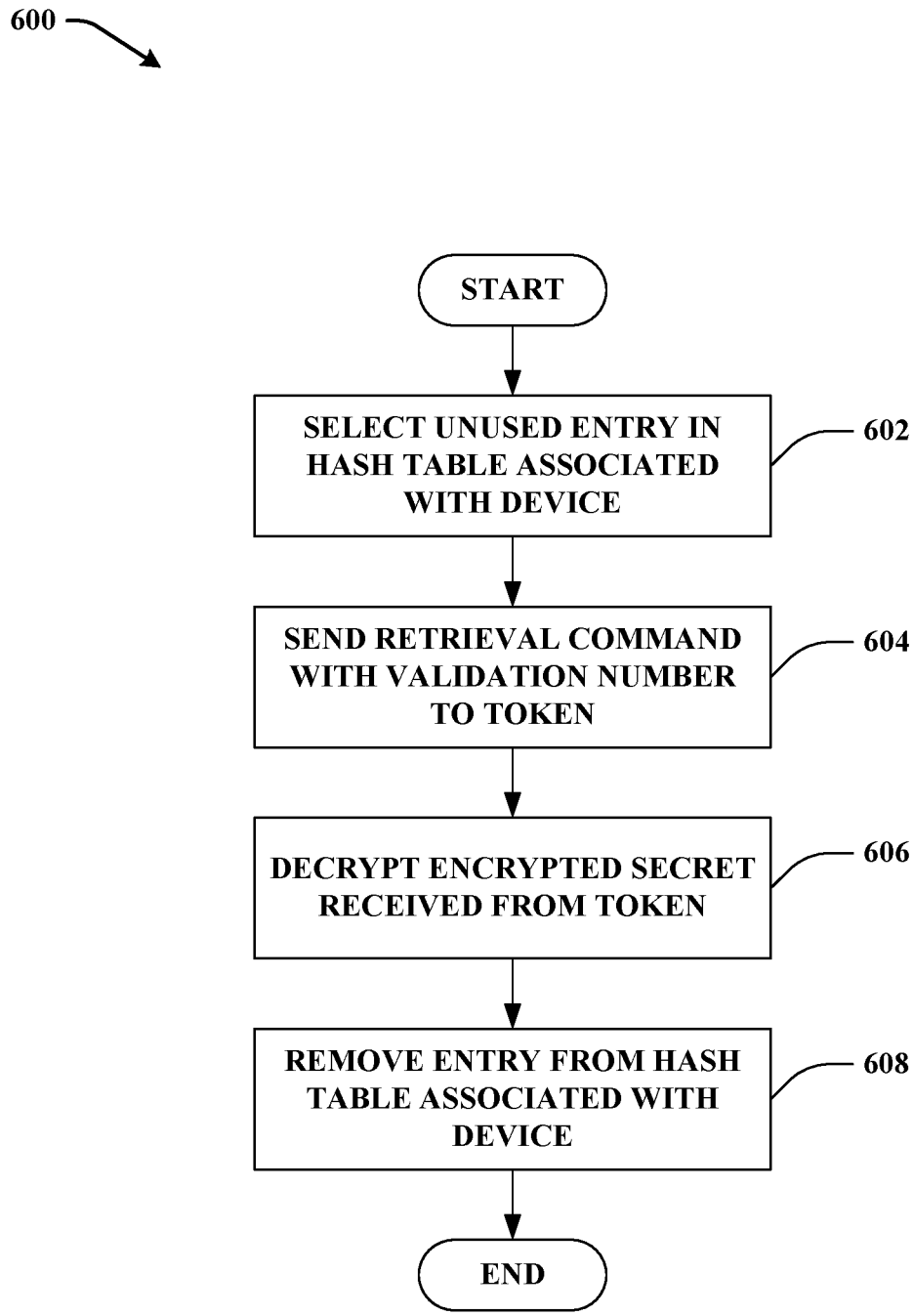
FIG. 6 provides further depiction of a machine implemented method for facilitating and/or effectuating a simple protocol for tangible security on mobile devices in accordance with an aspect of the claimed subject matter.
Figure 7:
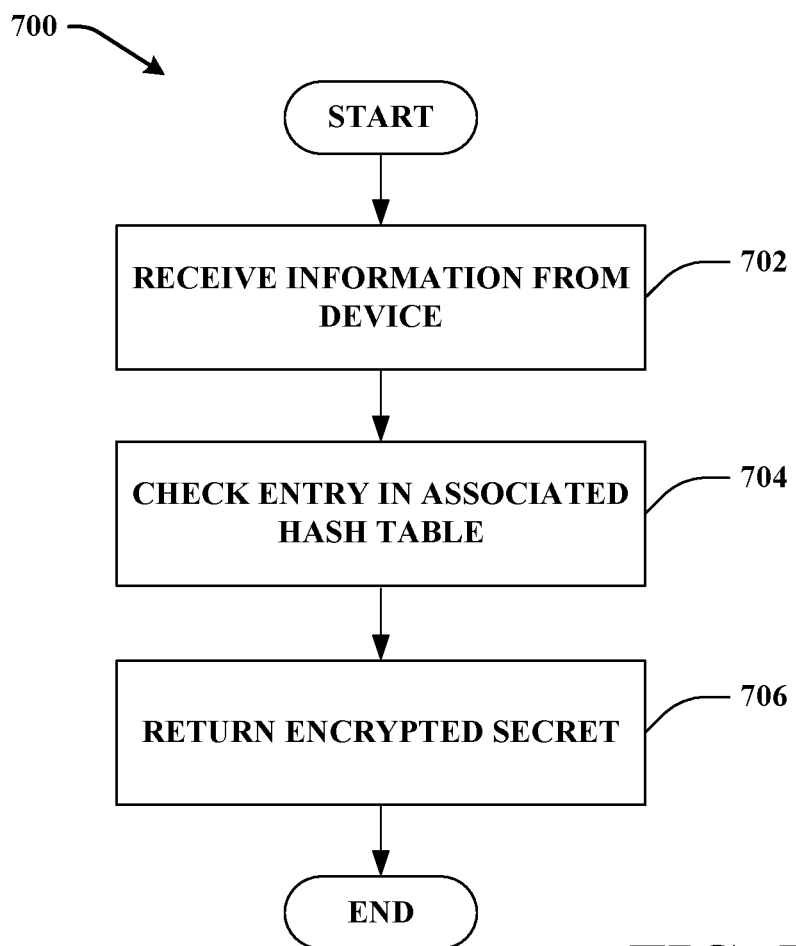
FIG. 7 provides a further illustration of a method for actuating and/or facilitating a simple protocol for tangible security on mobile devices in accordance with an aspect of the claimed subject matter.

In view of the illustrative systems shown and described supra, methodologies that may be implemented in accordance with the disclosed subject matter will be better appreciated with reference to the flow charts of FIGS. 5-7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 5 provides depiction in flow chart form of a machine implemented methodology 500 for effectuating and/or facilitating a simple protocol for tangible security on mobile devices. Methodology 500 can commence at 502 where mobile device 106 and security token device 102 can be communicatively and/or electrically coupled. At 504 a set of N AES keys $k_1, \ldots, k_N$, can be generated, such that there are few, if any, collisions among $H(k_1), \ldots, H(k_N)$. Further at 504 $e_i = E(S, k_i)$, $i=1 \ldots N$, can be computed and thereafter at 506 each $(p_i, e_i)$ can be propagated and persisted to table $T_{token}$ associated with security token device 102 at entry H($k_i$) and similarly each ($p_i$, $k_i$) can be stored to table $T_{phone}$ associated with mobile device 106.

FIG. 6 provides further depiction of a machine implemented method 600 for facilitating and/or effectuating a simple protocol for tangible security on mobile devices. Method 600 can be utilized whenever a mobile device wants to retrieve a secret from a security token device. Accordingly method 600 can commence at 602 where a selection of an unused entry (e.g., (p, k)) in the hash table associated with the mobile device (e.g., $T_{phone}$) can be made. At 604 a retrieval command in conjunction with a validation number p can be directed to the security token device. At 606 the method can decrypt the encrypted secret e received from the security token device. Once the encrypted secret received from the security token device has been decrypted successfully, the method can proceed to 608 at which point the entry (p, k) can be erased from the hash table associated with the mobile device (e.g., $T_{phone}$).

FIG. 7 provides a further illustration of a method 700 for actuating and/or facilitating a simple protocol for tangible security on mobile devices. Method 700 can be utilized in conjunction with method 600 (above) whenever a mobile device wants to retrieve a secret from a security token device. Method 700 can start at 702 where the security token device receives a retrieval command and a validation number p from a mobile device. At 704 the method can facilitate checking whether the validation number p received from the mobile device corresponds with an entry persisted on in the hash table associated with the security device (e.g., checks whether the entry (p', e) at index H(p) matches the received validation number p). If the two validation numbers match (e.g., p'=p) methodology 700 sends back the encrypted secret e, from which the secret S can be derived.

Figure 8:
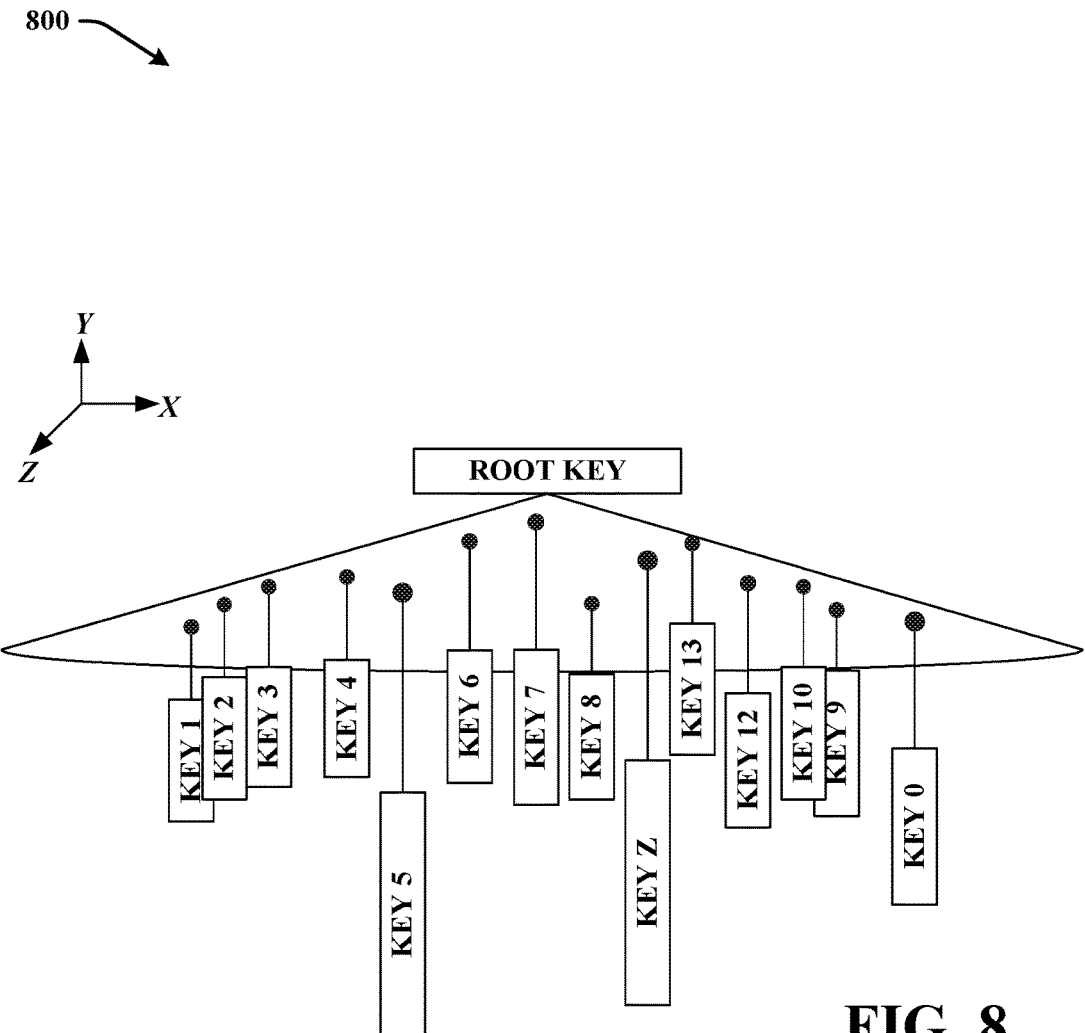
FIG. 8 provides illustration of a three dimensional hierarchical structure that can be utilized by a security token device to store the multiple keys necessary to unlock or lock different aspects of any personal information persisted on a mobile device in accordance with various aspects of the claimed subject matter.

FIG. 8 provides illustration of three dimensional hierarchical structure 800 that can be utilized by security token device 102 to store the keys (Key 0, . . . , Key Z) necessary to unlock or lock different aspects of any personal information persisted on mobile device 106. As illustrated the three dimensional hierarchical structure 800 can contain a root key from which all other depending keys can be derived. It should be noted that while three dimensional hierarchical structure 800 is illustrated as consisting of a single level, it will be appreciated that the three dimensional hierarchical structure 800 can have multiple levels of three dimensional hierarchical substructure depending there from. For instance a key (e.g., Key 7) that is derived from the root key can have multiple dependent keys that can be derived from a combination of characteristics of the root key and key 7.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the claimed subject matter may be implemented as a system, method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission, and/or display devices.

Figure 9:
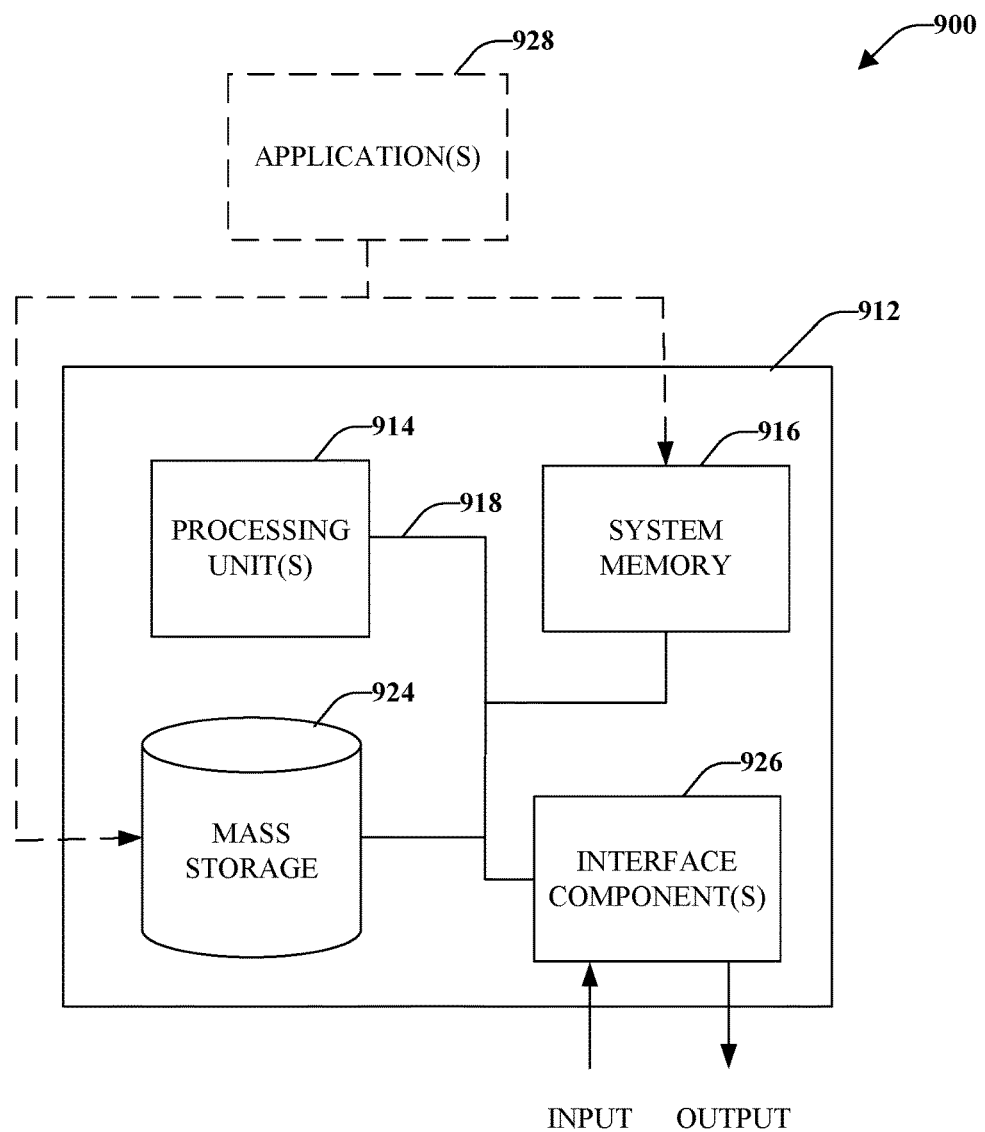
FIG. 9 illustrates a block diagram of a computer operable to execute the disclosed system in accordance with an aspect of the claimed subject matter.
Figure 10:
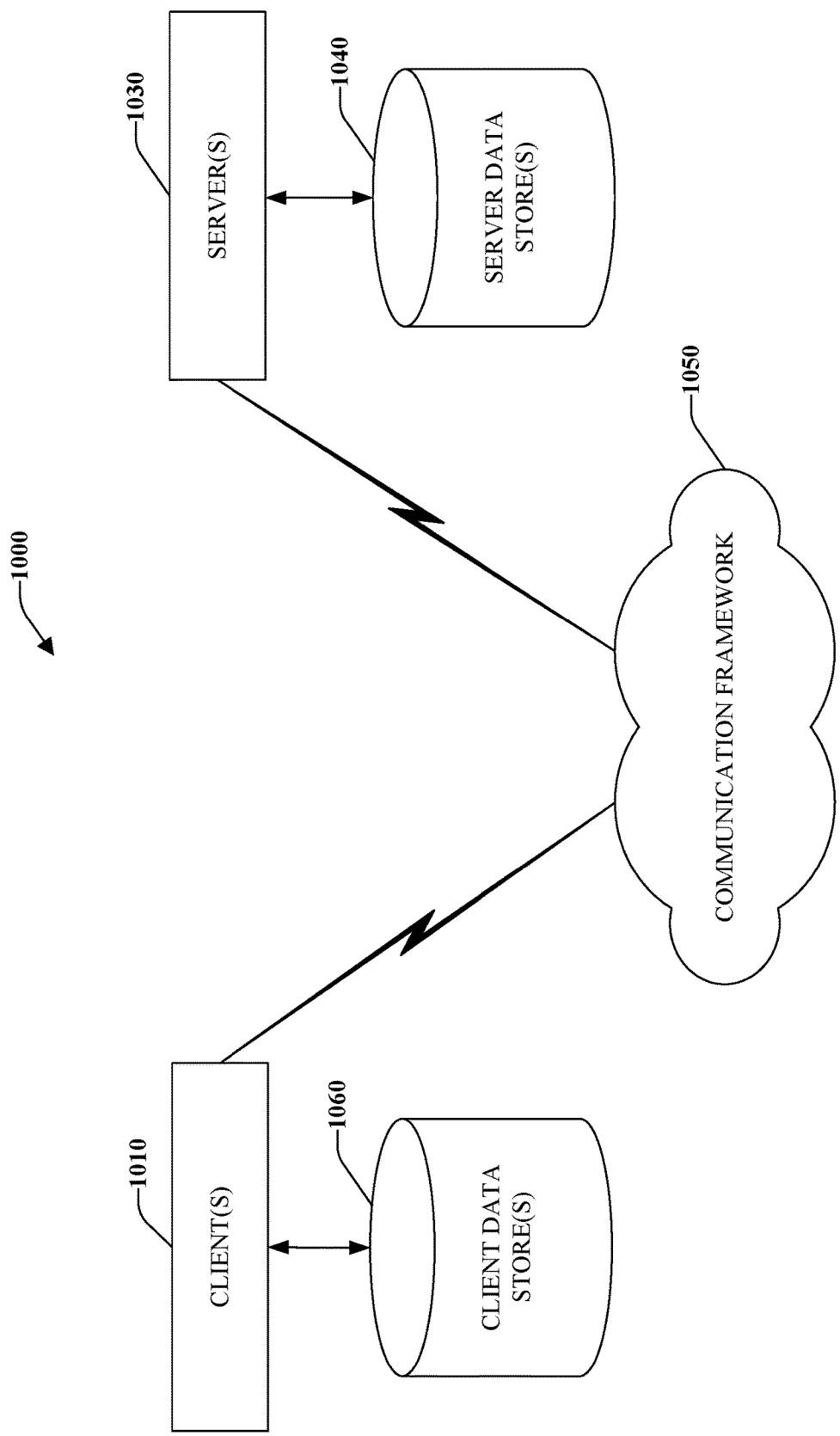
FIG. 10 illustrates a schematic block diagram of an illustrative computing environment for processing the disclosed architecture in accordance with another aspect.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 900 for implementing various aspects disclosed herein includes a computer 912 (e.g., desktop, laptop, server, hand held, programmable consumer or industrial electronics . . . ). The computer 912 includes a processing unit 914, a system memory 916, and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory, or memory stick. In addition, mass storage 924 can include storage media separately or in combination with other storage media.

FIG. 9 provides software application(s) 928 that act as an intermediary between users and/or other computers and the basic computer resources described in suitable operating environment 900. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers, and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
   encrypting, by one or more processor of a computing device, a secret using one or more keys to create one or more encrypted versions of the secret;
   sending, to a security token device, the one or more encrypted versions of the secret to be stored on the security token device, the sending being performed while the computing device is within a predetermined proximity to the security token device;
   receiving a request for use of the secret; and
   in response to receiving the request for use of the secret and based at least in part on determining that the security token device is within the predetermined proximity to the computing device:
   retrieving, by the computing device, at least one encrypted version of the secret of the one or more encrypted versions of the secret from the security token device; and
   decrypting the at least one encrypted version of the secret using at least one key of the one or more keys.

2. The method of claim 1, further comprising sending, to the security token device, one or more secret identifiers, each of the one or more secret identifiers being associated with at least one of the one or more keys used to encrypt the secret.

3. The method of claim 1, wherein at least one of sending the one or more encrypted versions of the secret or the retrieving the at least one encrypted version of the secret is performed over at least one of:
- a personal area network (PAN);
- a local area network (LAN);
- a campus area network (CAN);
- metropolitan area network (MAN);
- an extranet;
- an intranet;
- the Internet; or
- a wide area network (WAN).

4. The method of claim 2, wherein the sending the one or more encrypted versions of the secret while the computing device is within the predetermined proximity to the security token device comprises sending the one or more encrypted versions of the secret while the computing device is in electrical contact with the security token device.

5. The method of claim 4, further comprising supplying power to the security token device while the computing device is in electrical contact with the security token device.

6. The method of claim 1, wherein the retrieving the at least one encrypted version of the secret of the one or more encrypted versions of the secret from the security token device comprises:
- sending, to the security token device, a retrieval request for the at least one encrypted version of the secret; and
- receiving, from the security token device, the at least one encrypted version of the secret.

7. The method of claim 1, wherein the secret comprises a password.

8. A computing device comprising:
- one or more processors; and
- memory communicatively coupled to the one or more processors and storing instructions that, when executed, configure the one or more processors to perform acts comprising:
  - encrypting a secret using one or more keys to create one or more encrypted versions of the secret;
  - sending, to a security token device, the one or more encrypted versions of the secret to be stored on the security token device, the sending being performed while the computing device is within a predetermined proximity to the security token device;
  - determining that a component of the computing device requests use of the secret; and
  - based at least in part on the determining that the component requests use of the secret and determining that the security token device is within the predetermined proximity to the computing device:
    - retrieving at least one encrypted version of the secret of the one or more encrypted versions of the secret from the security token device; and
    - decrypting the at least one encrypted version of the secret using at least one key of the one or more keys.

9. The computing device of claim 8, the acts further comprising sending, to the security token device, one or more secret identifiers, each of the one or more secret identifiers being associated with at least one of the one or more keys used to encrypt the secret.

10. The computing device of claim 8, wherein the secret comprises at least one of a password or user identification information.

11. The computing device of claim 8, wherein the secret comprises information associated with unlocking an account associated with the computing device.

12. The computing device of claim 8, wherein the secret comprises information associated with purchasing a good or service.

13. The computing device of claim 8, wherein at least one of the sending the one or more encrypted versions of the secret or the retrieving the at least one encrypted version of the secret is performed over at least one of:
- a personal area network (PAN);
- a local area network (LAN);
- a campus area network (CAN);
- metropolitan area network (MAN);
- an extranet;
- an intranet;
- the Internet; or
- a wide area network (WAN).

14. A system comprising:
- one or more processors; and
- memory communicatively coupled to the one or more processors and storing instructions that, when executed, configure the one or more processors to perform acts comprising:
  - sending, to a security token device, a secret to be stored on the security token device, the sending being performed while the system is within a predetermined proximity to the security token device;
  - determining that the secret is being requested;
  - detecting that the security token device is within the predetermined proximity to the system; and
  - based at least in part on the determining that the secret is being requested and the detecting that the security token device is within the predetermined proximity to the system:
  - retrieving the secret from the security token device; and
  - performing an action using the secret.

15. The system of claim 14, wherein the sending the secret while the system is within the predetermined proximity to the security token device comprises sending the secret while the system is in electrical contact with the security token device.

16. The system of claim 15, wherein the acts further comprise supplying power to the security token device while the system is in electrical contact with the security token device.

17. The system of claim 14, wherein the security token device comprises at least one of a watch, a watchband, a bracelet, a necklace, a cufflink, a key fob, a tie clip, a card, or a phone.

18. The system of claim 14, wherein the secret comprises at least one of a password or user identification information.

19. The system of claim 14, wherein the at least one secret comprises at least one of credit card information, debit card information, or bank account information.

20. The system of claim 14, wherein at least one of the sending the secret or the retrieving the secret is performed using at least one of near-field communication or communication over a personal area network.

* * * * *